United States Patent Office 2,961,374
Patented Nov. 22, 1960

2,961,374

INJECTABLE PHARMACEUTICAL PREPARATION, AND A METHOD OF MAKING SAME

Hans Lieb, Universitaetsplatz 2, Graz, Austria; Ernst Kupelwieser, Moenchsberg 17, Salzburg, Austria; and Anton Holasek, Universitaetsplatz 2, Graz, Austria No Drawing. Filed Oct. 11, 1951, Ser. No. 250,961

Claims priority, application Austria Oct. 14, 1950

3 Claims. (Cl. 167—58)

This invention relates to injectable pharmaceutical preparations capable of forming, on injection, depots of therapeutically effective compounds, and a method of making same.

In therapy, it is often of great importance that therapeutically effective compounds, when administered parenterally, have prolonged activity. In order to achieve this purpose, a depot of the therapeutically effective compound is produced in the body by injection at the place of injection, said depot allowing continuous but retarded absorption and, thus, continuous but prolonged action of said therapeutically effective compound.

However, it was found to be very difficult to maintain a sufficiently high blood level of such compounds over a certain period of time without causing overdosing. In order to produce such depots, various methods were suggested heretofore. For instance, difficultly soluble medicines were implanted in pellet or the like form into the body. Readily soluble medicines were coated, before implantation, with coatings which rendered more difficult their absorption by the body fluids. Such coatings consisted of waxes and the like. This manner of producing a depot of a therapeutically effective compound in the body has several disadvantages. First, implantation necessitates a bloody operation with all the dangers of infection and the like connected therewith. Frequently, the implanted pellets, soon after implantation, were surrounded by tissue and are, so to say, encased in form of a cyst, thus, preventing further absorption of the therapeutically effective compound.

Another method of producing depots of therapeutically effective compounds consists in injecting such a compound in the form of a suspension in suitable liquids. However, when using water soluble compounds, and injecting, for instance, their suspensions in oils and the like, the retarding effect of such injections is usually very short and it is often difficult to avoid overdosing and the creation of an excessively high blood level shortly after injection and of too low a blood level later on.

It has also been suggested to administer the therapeutically effective compound in the form of an emulsion or dispersed in a viscous colloidal vehicle, said emulsions and vehicles being adapted to retard absorption. Procain penicillin, for instance, has been administered in suspension in an oily vehicle to which aluminum stearate was added. Thereby a thixotropic medium is formed which prevents too rapid absorption of the penicillin salt. But such thixotropic additions cause only a slight and temporary increase in viscosity and do not form a depot of sufficiently prolonged activity. Such suspensions have furthermore the disadvantage that they tend to clog the injection needle. Therefore, injection needles of large diameter have to be used which cause pain on inserting the same into the body.

Mixtures of polyvinyl alcohols or their water-soluble derivatives with at least one solvent capable of dissolving said polyvinyl compounds and with the addition of Congo red, have also been suggested as carriers for the therapeutically effective compounds. Such mixtures are liquid at about 45° C. Such preparations were injected at 45° C. and solidified at body temperature. The injection of such a warm preparation is quite disagreeable. Furthermore, since such solidified polyvinyl compounds are water-soluble, even in the solid state, they are very readily dissolved by the body fluid and absorbed. Therefore, the prolonged effect achieved by using such a carrier for a therapeutically effective compound is comparatively short.

The method of implanting pellets and the like by surgical operation should be avoided if possible, especially if the therapeutically effective compound has to be administered repeatedly. Furthermore, said compounds, on account of their decreased solubility when compressed to tablets, pellets and the like, very often are not sufficiently soluble to produce the desired therapeutic effect.

Emulsions and colloidal vehicles have the disadvantage that only emulsions and vehicles having a limited range of viscosity can be used for the production of depots because difficulties in injecting such emulsions and vehicles are often encountered. Even when using syringes with spindles and needles with a very wide diameter, only such vehicles are suitable for injection which are still liquid and flowable.

With thixotropic vehicles, only slight and labile changes and increases in viscosity are produced, due to the nature of the thixotropic phenomenon. The vehicles do not solidify as is necessary to produce depots of long duration.

One object of the present invention is to provide depot vehicles for therapeutically effective compounds which allow injection by means of ordinary syringes and needles of normal diameter and, thereby, production of depots which are dissolved mainly by fermentative or cellular effects.

Another object of this invention consists in providing pharmaceutical preparations for parenteral administration which, on injection, produce a prolonged effect of the therapeutically active compound contained in said preparations but which does not possess the disadvantages of the known and heretofore used depot preparations as mentioned above.

Other objects of this invention will become apparent from the specification and the examples illustrating the invention more in detail.

The invention consists in principle in combining at least two water soluble components which may be liquids or solid compounds or may be employed in solution and which are capable of reacting with each other, or influencing each other, in such a manner that the solubility of the reaction product in water is reduced and the reaction product solidifies. Such proportions of said components are used that the injectable solution obtained by such a combination, initially, is liquid below or at body temperature but solidifies to a difficultly soluble depot within a predetermined period of time. The two or more components are combined with each other, preferably immediately before injection, in such a manner that they solidify in the body after a predetermined period of time as planned. Said components should be substantially non-toxic and non-irritating to and well compatible with the body, in the concentrations and amounts employed. Their reaction product forming the depot must be slowly but completely absorbed from and eliminated by the body.

In order to carry out the process of this invention, there are first prepared a solution of a coagulable, setting or in any other manner solidifying material and a solution of a material capable of inducing or causing said coagulating, setting or solidifying process, i.e., for instance, a solution of a coagulating or hardening agent. The concentrations of said solutions are adjusted with respect to each other in such a manner that, after combining the same, the materials contained therein solidify after a predetermined period of time and form a difficultly soluble depot within the area of administration to the body. Examples for such systems are, for instance:

Fibrinogen-thrombin, casein-rennet, gelatine-formaldehyde, gelatine-quinone, gelatine-cobalt compounds, gelatine-chromium compounds and many others more.

Of course, it is possible to combine at the same time more than one hardening agent or more than one solidifying material. The therapeutically effective compound may be dissolved or dispersed in any one or in all of these components. It may also be added to the solution obtained after combining the two components, just before the injection.

The injection solution may be rendered less viscous by various methods, such as slight heating, addition of compounds capable of regulating viscosity, and the like. Of course, only such additions should be used which do not substantially impair subsequent solidification of the components.

The process according to this invention and the preparations obtained thereby may be used, among others, for producing depots of analgesics, local anesthetics, antibiotics, agents stimulating the vegetative nervous system, hormones, especially insulin, parathyroid hormone, pituitary gland hormones, and others more.

According to this invention, a vehicle for a therapeutically effective compound is used which, before injection, is in the liquid state but which, after injection, solidifies at the place and area of injection to a difficultly soluble, solid, and, for instance, gel-like material, said material keeping combined therewith the therapeutically effective compound so that its absorption is retarded and that it exerts a prolonged effect. The dissolution and absorption of the therapeutically effective compound from said solidified vehicle takes place either by diffusion or by dissolution at a rate at which the vehicle itself is dissolved and absorbed by the body.

One may also use one of the components in solid form and the other in form of a solution. The components may also be mixed in solid dry form and may be dissolved shortly before injection so as to yield the solidifying or gelatinizing mixture. The components may solidify in the body by coagulation but also other types of solidification may be used. Especially suitable was found a system of compounds which solidifies by hardening and sets to a mass which is relatively insoluble in body fluids.

A coagulating system suitable for carrying out this invention is the system fibrinogen-thrombin. Fibrinogen, thrombin and a preferably difficultly soluble therapeutically effective compound, in the dry state, are placed into a vial. The amount of thrombin is calculated in such a manner, that a solution of the contents of said vial, preferably a physiological salt solution, requires, at a temperature of 37° C., about 4 to 5 minutes for coagulating the fibrinogen solution. For administering said fibrinogen-thrombin-medicament mixture, the contents of said vial are mixed with the necessary amount of physiological salt solution whereby a suspension of the medicament in the fibrinogen-thrombin solution is obtained. On account of the comparatively low temperature of the salt solution the coagulation time is somewhat retarded. But on injecting such a mixture and suspension into the body, the fibrinogen very soon forms a fibrin gel which keeps the medicament in a, so to say, adsorbed condition and prevents its rapid absorption by the body fluids. However, after a certain period of time the fibrin also is gradually and completely absorbed by the body thereby gradually releasing the medicament which, likewise, is slowly absorbed. The fibrin, as long as it is present in the body, prevents too rapid absorption of the medicament because it forms a comparatively firm combination with said medicament. Only after breaking down the fibrin molecule will the medicament be absorbed because it is then exposed to the action of the body fluids. By this method, for instance, it is possible to produce a prolonged nerve block anesthesia by means of dibucaine hydrochloride (2-butoxy-N-(2-diethyl amino ethyl)-cinchonine amide hydrochloride). This compound, as is known, is many times more effective than procaine hydrochloride but also more toxic. By the method of this invention, larger amounts of said dibucaine hydrochloride may be administered thus causing a more prolonged anesthetic effect without the danger of disagreeable side-effects, such as necrosis of tissue, gangrene or, in lower concentrations, of slight temporary vascular dilatation.

Another very suitable system which is preferably employed to carry out this invention is the system gelatine-formaldehyde. It is advisable to employ for the purpose of this invention a gelatine of a melting point as high as possible. The suitability of a gelatine may be determined in a simple and effective manner by preparing an 18% solution of gelatine, adding 0.2 cc. of a 2.5% formaldehyde solution to 2.0 cc. of said 18% gelatine solution, mixing the mixture thoroughly by means of a glass rod, and determining the gelatinisation time at 37° C. The better the gelatine, the quicker does the solution gelatinize. Such 18–20% gelatine solutions are, even at 37° C. rather viscous. Their viscosity and melting point is lowered considerably by the addition of potassium thiocyanate, for instance, in amounts of 3–5%. A further reduction of viscosity is achieved by the addition of calcium ions which are supplied, for instance, in the form of a 0.7% calcium chloride solution.

Since formaldehyde has an irritating effect, care has to be taken to use as little as possible of the same. This is achieved by the use of gelatine solutions of high concentration. An addition of small amounts of alkali hydroxide has proved of additional value. For instance, by the addition of 1 cc. of a n/10 sodium hydroxide solution to 2 g. of gelatine, the gelatine solution is buffered and the irritating effect of the formaldehyde is suppressed while the pH-value of the injection-solution is not higher than about 8.0. When preparing, for instance, an insulin preparation of prolonged activity, such small sodium hydroxide addition does not impair the activity of said insulin. Apparently the insulin is protected by the gelatine. The higher the alkali hydroxide concentration, the lower the amount of formaldehyde required for hardening the gelatine.

Although formaldehyde addition shortly before injection apparently protects the gelatine solution against contamination by infective microorganisms, it is nevertheless advisable to subject the gelatine solution to sterile filtration, for instance, by means of Seitz filter and other filter candles and the like. A highly concentrated gelatine solution (18–20%), however, can not be filtered through such a filter. Therefore, a dilute solution of, for instance, 10–12% gelatine is filtered and is subsequently concentrated by evaporation in a vacuum.

The formaldehyde solution used contains preferably about 1% formaldehyde. 0.2–0.3 cc. are added to 2 cc. of an 18–20% gelatine solution. The formaldehyde solution must be stabilized. This can be done, for instance, by the addition of sodium chloride. Amounts of 5–10% of sodium chloride have given satisfactory stabilizing effects.

When adding formaldehyde to a slightly alkaline gelatine solution, a gel is formed immediately at the places of contact of the gelatine and the formaldehyde solution. In order to avoid such premature gel formation, hydrochloric acid is added to said formaldehyde solution. Gel formation takes place only after such acid is neutralized, i.e. as soon as both solutions have been mixed thoroughly. The formaldehyde solution contains preferably about 0.365 g. of hydrochloric acid in 1000 cc., corresponding to a n/100 hydrochloric acid solution.

As has been found, the best results are obtained by using a formaldehyde solution containing about 1% of formaldehyde, 0.0365% of hydrochloric acid, and 5–10% of sodium chloride. Such formaldehyde solution is kept in tube-like graduated ampoules provided with rubber closure caps which allow easy withdrawal of amounts of 0.2 cc.

Gelatine and formaldehyde concentration have a considerable influence upon gelatinisation time as can be seen from the following Table 1:

TABLE 1

| Formaldehyde per 0.2 cc. | Gelatininsation time in minutes of a gelatine solution containing x% of gelatine | | | |
|---|---|---|---|---|
| | 16.7% | 18.0% | 19.3% | 20.6% |
| 6 mg. (3%) | 7.5 | 6.3 | 4.5 | 2.5 |
| 4 mg. (2%) | 18.0 | 11.0 | 9.0 | 6.0 |
| 2 mg. (1%) | several hours | | more than 60 | 25.0 |

When adding sodium hydroxide to the gelatine solution, the amount of formaldehyde necessary to produce a gel within a practically suitable period of time is considerably reduced as is evident from the following Table 2:

TABLE 2

2 cc. of a 23% gelatine solution to which the below given amounts of sodium hydroxide were added, were hardened by 0.2 cc. of a 4% formaldehyde solution within the following time:

| sodium hydroxide addition expressed in normality | 0.0045 | 0.0023 | 0.0011 | 0.0006 |
|---|---|---|---|---|
| gelatininsation time in minutes | 1.2 | 1.5 | 2.5 | 3.5 |

2 cc. of a 10.7% gelatine solution containing sodium hydroxide in an amount sufficient to form an 0.0045 n solution, form with 0.2 cc. of a 1% formaldehyde solution within 21 minutes a honey like mass.

2 cc. of a 20% gelatine solution of 0.01 normality in NaOH form with 0.5 cc. of an 0.3% formaldehyde solution a gel within 8 minutes.

2 cc. of a 20% gelatine solution of 0.01 normality in NaOH form with 0.5 cc. of an 0.2% formaldehyde solution a sufficiently firm gel within 25 minutes. After 16 minutes the mixture has the consistency of honey.

The gelatine and the formaldehyde solutions may be mixed either in the ampoule containing the gelatine solution or in a syringe. When mixing in the ampoule, it is advisable to add the formaldehyde solution to the gelatine solution and then rapidly mixing said solutions. When mixing in the syringe, first the gelatine solution is drawn up and thereafter the formaldehyde solution. Both solutions are then thoroughly mixed by means of an air bubble. However, on account of the high viscosity of the gelatine solution, very frequently this method of mixing does not give satisfactory results. Therefore, a metal ball is placed into the syringe the movements of which cause the two solutions to be readily, completely and rapidly mixed with each other. The piston of the syringe is preferably provided with a recess so as to receive the metal ball and to allow quantitative injection of the contents of said syringe. In order to prevent adhesion of the ball to the piston, a small spring is provided at the bottom of the recess of said piston.

The retarding effect of a preparation according to this invention is readily demonstrated by the following experiment:

The dyestuff fluoresceine, after administration to a guinea pig, is excreted almost quantitatively in the urine and can be readily detected by the fluorescence it imparts to the urine, said fluorescence being visually observable. 2 cc. of a solution of fluoresceine in water, containing 0.37 g. of said dyestuff in 100 cc., were subcutaneously injected into control animals. The animals were kept on a green fodder diet in order to produce larger amounts of urine. The urine was collected and it was found that portions collected after 5 to 7 hours did not show any fluorescence on observation in day light, thereby indicating that all the fluoresceine was excreted before that time.

2 cc. of a 23% gelatine solution containing 0.37% of fluoresceine and mixed, before injection, with 0.2 cc. of a 2.8% formaldehyde solution, was injected subcutaneously into another animal. After 1 hour, fluorescence or the urine could be detected indicating that excretion of the dyestuff had already started. Fuorecsence did not markedly diminish within the first 31 hours. Even after 44 hours, weak fluorescence could be detected, thus indicating that the depot produced by injecting a preparation according to this invention has a very remarkable prolonging effect.

A 16% gelatine solution and a 20% gelatine solution of the dyestuff were mixed with a formaldehyde solution as described above. The mixtures obtained thereby, were administered, by intramuscular injection, to two other guinea pigs. The urine of these animals showed strong fluorescence up to 29 hours whereafter said fluorescence slowly disappeared.

In another experiment, a solution of fluoresceine sodium in a 20% gelatine solution was intramuscularly injected into a rabbit. The urine did not exhibit any fluorescence after 7 hours, thus indicating that all the dyestuff was excreted. The same amount of a 20% gelatine solution containing the same amount of fluoresceine but mixed, before injection, with a small amount of a 1% formaldehyde solution was injected into another rabbit. Even after 24 hours marked excretion of fluoresceine could be detected in the urine.

These experiments prove that the depot effect of a preparation according to this invention is quite remarkable. The dyestuff, although released from its depot a short time after injection, remains in the body about 7 times as long as when administered in aqueous solution, without depot effect.

It is possible to combine said gelatine-formaldehyde depots with oil emulsions, i.e. to use oil emulsions in gelatine solutions which are then hardened by formaldehyde in the same manner as described with aqueous gelatine solutions. Thus, therapeutically effective compounds can be administered which are soluble in oils but are not soluble in water. In this case it is, however, advisable to reduce the viscosity of the gelatine solution somewhat. The amount of formaldehyde added need not be changed; for, as far as has been found, it depends merely upon the amount of gelatine present in such preparations.

Intramuscular application apparently does not produce depots of such prolonged activity as depots produced by subcutaneous injection.

Another important application of depot preparations according to this invention consists in their use for filling body cavities and cavities produced by diseases, such as abscesses, bone cavities, tubercular caverns, and the like, with therapeutically effective compounds. It is known to drain and rinse such cavities by means of suitable medicamented solutions or to spray with a medicamented powder. But such solutions and powders remain therein only for a short period of time and, therefore, have only a brief therapeutic effect. It is of great importance to provide preparations which, after introduction into such cavities, remain therein for a longer time. This is possible by using a depot preparation according to this invention and by filling the cavity therewith. Since the preparation is administered in the liquid state and solidifies only after introduction into the cavity, it is capable of filling out the entire cavity, whereafter it is converted into the solid state. Thereby, not only the advantage is achieved that said cavity is mechanically closed for a longer period of time, but that it is possible to introduce medicaments in such amounts which can not be administered by other methods because, on account of their rapid absorption, they would have a detrimental effect upon the body. A preparation according to this invention, however, does not release the medicament rapidly and, therefore, much larger amounts of medicaments and antiseptics may be applied to such cavities. Since the cavity, in general, is not exposed to the action of the body fluids to such an extent as, for instance, a muscle, the further advantage is achieved that actually the dissolution of the depot takes place at a comparatively slow rate, thereby extending the effect of the medicament over a very long period of time.

A preparation according to this invention may also be injected into the uterus or into the bladder and the like. The new preparations may furthermore be used for obliteration of varicose veins. It is evident that such new preparations may find extensive application in therapy in cases where prolonged activity of a medicament is essential or desirable.

Preparations of the type gelatine-quinone have proved to be especially effective, but other systems may be used likewise.

Fibrinogen produced in any manner known per se may also be used for the purpose of this invention. Fibrinogen obtained from human blood is preferred. It may be prepared according to directions given, for instance, by Cohn, Strong, Hughes et al. in Journ. Am. Chem. Soc., vol. 68, page 459 (1946), or by Wunderly in Helv. Chim. Acta, vol. 31, page 49 (1948).

Thrombine may be produced according to instructions given by Seegers et al., Journ. Biol. Chem., vol. 123, page 751 (1938). The time of coagulation of fibrinogen by thrombine is influenced by the fibrinogen concentration, the thrombine concentration, the ion content of said solutions, the type of ions present, the presence of proteins, the pH-value, and others more. It may be retarded by various additions such as glycerol, salicylates, benzene sulfonates and others more. Increase in fibrinogen concentration while the thrombine concentration and all other conditions remain constant, increases coagulation time. Increase in thrombin concentration decreases coagulation time. Increase in ion concentration also increases coagulation time, whereby the type of ions present is of great importance. Some ions, such as citrate, phosphate and the like ions, are capable of considerably retarding coagulation, even when present in small concentrations. Chloride ions (for instance, addition of sodium chloride to the fibrinogen solutions) also retard coagulation with increasing amounts. On the other hand, other ions, especially calcium ions, are capable of accelerating coagulation with increasing amounts. Contamination by proteins which, of course, should be avoided, especially when administering the new preparations to human patients, retards coagulation. Change in hydrogen ion concentration has also a remarkable influence upon coagulation. Neutral solutions show shortest coagulation time. With increasing pH and even more with decreasing pH, coagulation time increases. Glycerol has a strongly retarding effect upon coagulation. Temperature increase up to 30° C. causes decrease in coagulation time while above 30° C. coagulation is gradually retarded.

Fragility and elasticity of the fibrin gel produced is closely connected with its power of retraction. Fragile and, therefore, less retractable fibrin gels are obtained by using higher fibrinogen concentrations. Addition of retarding agents, such as glycerol, are also capable of producing less retractable gels. It is, therefore, advisable, when using higher thrombin concentrations, to employ higher fibrinogen concentrations and to add retarding agents in order to prolong coagulation time. The oncotic pressure of the fibrin gel, thus, can be regulated by the addition of salts, colloids, such as gelatine, and others, so that it does not differ too much from that of the tissue.

The system fibrinogen-thrombin can be adjusted in such a manner that it is possible to produce combinations of varied coagulation time. For instance, when increasing the fibrinogen concentration but keeping all the other conditions constant, the coagulation time increases as will be seen from the following Table 3:

TABLE 3

| Fibrinogen concentration, percent | Coagulation time in minutes | |
|---|---|---|
| | 0.5 units of thrombin per cc. | 2 units of thrombin per cc. |
| 0.15 | 1.2 | 0.4 |
| 0.60 | 1.7 | 0.45 |
| 2.50 | 4.0 | 1.0 |

That increase in thrombin concentration decreases coagulation time, is shown by the following Table 4:

TABLE 4

| Units of thrombin per cc. of preparation: | Coagulation time in minutes |
|---|---|
| 0.05 | more than 12 |
| 0.4 | 3.8 |
| 0.9 | 2.1 |
| 1.7 | 1.2 |
| 3.3 | 0.6 |

The influence of ion addition to the fibrinogen-thrombin system is shown in the following Table 5 whereby sodium chloride is added to the fibrinogen-thrombin solution:

TABLE 5

| Sodium chloride concentration expressed in normality: | Coagulation time in minutes |
|---|---|
| 0.1 | 0.8 |
| 0.2 | 1.5 |
| 0.3 | 2.2 |
| 0.4 | 3.6 |
| 0.5 | 4.3 |
| 0.6 | 6.0 |

The effect of hydrogen ion concentration upon coagulation time is demonstrated in the following table. It is shortest at a pH of 7.0, but increases with decreasing pH:

| pH: | Coagulation time in minutes |
|---|---|
| 6.9 | 2.1 |
| 6.6 | 3.2 |
| 6.3 | 5.0 |

The retarding effect of glycerol is shown in the following Table 7:

TABLE 7

| Glycerol addition in percent: | Coagulation time in minutes |
|---|---|
| 0.00 | 1.5 |
| 0.12 | 3.2 |
| 0.50 | 7.0 |

The influence of temperature increase is shown in the following Table 8:

TABLE 8

| Temperature in ° C.: | Coagulation time in minutes |
|---|---|
| 10 | 1.5 |
| 20 | 0.6 |
| 30 | 0.4 |
| 40 | 0.5 |

In the place of thrombin, there may be used other substances to cause coagulation of fibrinogen, for instance, ninhydrin (triketo hydrindenhydrate) salicylic aldehyde, alloxan, and others. Although ninhydrin has some toxic effect, it is used in such small amounts (0.1–1.0 mg. per 1 g. of fibrinogen) that it can not exert any unfavorable effect upon the body.

Since fibrinogen and thrombin are stable only in the solid dry state, the best way to store a fibrinogen-thrombin preparation according to this invention is to keep fibrinogen in an ampoule, thrombin in another ampoule, and the aqueous solution which may contain the accelerating or retarding agents, buffering compounds and the like, in a third ampoule. Shortly before injection fibrinogen is first dissolved whereafter the fibrinogen solution is added to thrombin, and, after thorough mixing, the mixture is injected into the body. The therapeutically effective compound may be added to the fibrinogen or to the thrombin or it may be dissolved or suspended in the solvent solution or it may even be added after mixing fibrinogen and thrombin. It is, of course, also possible to place fibrinogen, thrombin, and the medicament into the same ampoule, especially if a fibrinogen is selected which has about the same solubility properties as thrombin, and to add thereto the solvent solution, whereafter the mixture is thoroughly mixed until all the fibrinogen and thrombin are dissolved. The solution or suspension of the medicament in said fibrinogen-thrombin solution can then be injected.

Formaldehyde, for gelatine hardening, is used in such small amounts that no toxic effects need be feared. Furthermore, the greatest part of said formaldehyde is combined with the gelatine.

Chromium$^{III}$-compounds are also used in very small amounts so that no toxic effect will be caused. It is advisable, when using chromium compounds as hardening agents, to add local anesthetics to the preparation because usually injections of chromium compounds are somewhat painful.

Chromium ions are added by using a solution of a suitable chromium salt, such as chrome alum in the form of a 1% solution corresponding to a 0.1% solution of chromium$^{III}$ ions. Such a dilute solution, however, must be stabilized, for instance, by the addition of neutral salts, in order to retard hydrolysis. Acid addition is also capable to increase stability of such solutions; but a gel produced by means of such an acid stabilized solution liquifies after a few hours. Therefore, such a solution can be used for very specific purposes only. The hardening time is shortened with increasing chromium ion concentration.

As cobalt compounds there are used with great success cobalti triamin complex compounds. They are without toxic effect when applied in such small amounts as required for hardening gelatine.

When using cobalt in the form of the so-called dichro chloride, it is necessary to retard hardening because a gel forms immediately on addition of said compound. For this purpose, potassium thiocyanate is added to the gelatine solution. The more potassium thiocyanate is present, the more slowly proceeds the hardening process and the more dichro chloride is necessary. Adding acids, such as hydrochloric acid, to the dichro chloride solution also retards gelatinisation, but the gel formed liquifies within a comparatively short time as with chromium compounds. Other cobalt triamin complex compounds than the dichro chloride may also be used. All these cobalt complex salts, however, form rather unstable solutions. Therefore, such solutions have to be freshly prepared and must be stored in the dark, in order to retard hydrolysis. Hydrolysis of such solution may be suppressed for a few days by the addition of ammonium chloride, gum arabic, organic dyestuffs, such as methylene blue and the like.

Aluminum compounds may also be used as hardening agents. They form, immediately after addition, a gel with gelatine. Therefore, gel formation retarding agents must be added. Aluminum compounds are especially suitable on account of their very low toxicity.

Hardening by metal compounds, generally, does not produce depots of very long duration. Usually depots of 24 hours duration are obtained. When adding sympathomimetic agents, such as adrenalin, synephrine tartrate and other compounds of this type, to preparations containing metal compounds as hardening agents, the flow of body fluid is throttled and, therefore, less medicament is absorbed due to contraction of the blood vessels.

Quinone is capable of forming a very stable gel which remains in the body for a very long time. The small amounts of quinone used (about 10 mg. of quinone for 2 cc. of gelatine solution) are harmless.

Such quinone-gelatine depots are very hard and are slowly dissolved by the body fluids when injected subcutaneously. Their prolonged effect may last for several weeks. Another advantage of quinone is that it causes hardening of relatively dilute gelatine solutions, such as solutions containing only 12% of gelatine. Such solutions are quite liquid and, therefore, are especially suitable for injection. One disadvantage of quinone hardened gelatine gels is their discoloration. The solution starts to acquire a yellowish to brownish color shortly after addition of the quinone. It is also possible to add quinone in solid form to gelatine solutions because it is readily dissolved by such solutions. Like quinone there may be used quinhydrone which requires, of course, larger amounts.

It is possible to combine various hardening and coagulating agents, such as, for instance, chromium compounds and formaldehyde. The chromium compound forms a gel rapidly while the formaldehyde has a much slower hardening effect, especially when the gelatine solution is not alkaline, but it yields a hard gel. Such a mixture of hardening agents is especially suitable for hardening a slightly acid gelatine solution.

Such slightly acid gelatine solutions are often required because various medicaments are not stable in alkaline gelatine solutions. An acid gelatine solution, however, requires for hardening a very long time, often days. In such a case the use of a mixture of hardening agents of rapid action such as a chromium salt solution, and of slow action, such as formaldehyde, has been of great advantage. It is, of course, also possible to add a slightly alkaline formaldehyde solution which, however, is not very stable, or an alkaline formaldehyde compound to the gelatine solution. One may also add formaldehyde to the gelatine solution and thereafter start the hardening process by the addition of a buffer solution capable of producing a slightly alkaline reaction. Of course, the gelatine solution should not become too acid in order to avoid any hydrolytic decomposition of the same.

Of course, other hardening and tanning agents may also be used for the purpose of this invention although formaldehyde represents the preferred hardening agent.

The therapeutically effective compound and the two components, namely the coagulating or solidifying agent and the material capable of solidifying or coagulating under the influence of such agents, are mixed and combined, shortly and immediately before injection, by the physician or the person administering the new preparation. In the case of gelatine, it is advisable to heat the gelatine solution to about 30–35° C. Solidification starts already in vitro. It must be retarded to such an extent that injection of the solution by an ordinary injection needle is possible. This increase in viscosity of a gelatine solution to which formaldehyde was added, may be observed in vitro by inserting a glass rod into the mixture and withdrawing said glass rod after a certain period of time. In all cases, a filament-like structure adheres to the end of the rod said filament becoming thicker and thicker with increasing viscosity. Finally the viscosity is so high and hardening has proceeded to such an extent that the entire viscous content together with the test tube can be lifted when trying to withdraw the glass rod. The gel, at this moment, does not change anymore its form and surface.

A gelatine-formaldehyde mixture, according to this invention, is injected at a moment when the viscosity has not yet increased considerably, usually immediately after mixing the components. Concentration of the compounds and other additions and conditions are adjusted in such a manner that the gel is formed within 6 to 25 minutes. It has been found that such a mixture, on injection, although the gel is not formed, has attained such a viscosity that almost none of the medicament is dissolved and removed by the body fluids. Addition of adrenalin or a compound of similar activity to prevent premature absorption of the medicament by its contracting effect upon the blood vessels, is of advantage.

It is, of course, possible to prepare combinations according to this invention, which allow the physician to wait for 10 to 30 minutes after mixing, before injecting the mixture. But it has proved advisable to inject the mixture immediately after mixing and, therefore, to adjust concentration and other conditions accordingly.

Potassium thiocyanate is the preferred agent for regulating the viscosity of the gelatine solutions, but other agents, such as magnesium chloride, calcium chloride and others, may be used likewise.

Small amounts of calcium ions (0.5–0.8%) or larger amounts of magnesium ions have the same reducing effect upon the viscosity. Magnesium ions are of advantage because they can be injected in very large amounts without causing any side-effects. On the contrary, magnesium exerts a good local anesthetic effect and, therefore, is capable of eliminating any irritation caused by the hardening agent. Organic compounds, such as furfuryl alcohol in amounts of 2–5%, are also capable of reducing the viscosity of gelatine solutions.

Iodine ions may also be used; but, of course, they are not entirely harmless. Potassium cyanate may be added in amounts up to about 5%, calcium chloride up to 4%, magnesium sulfate or magnesium chloride even up to 50%.

In the place of formaldehyde, it is possible to employ formaldehyde which has already been reacted with gelatine. Such a material is obtained, for instance, by treating a dry gelatine powder in the cold with a formaldehyde solution (2% formaldehyde), drying the treated gelatine, in a vacuum, and comminuting the dried product to a powder. When adding such a powder to a gelatine solution, the gelatine therein is also hardened.

Formaldehyde may also be used in the form of a solid compound which yields under the influence of a gelatine solution or of changes in the reaction conditions, for instance, by a rise in temperature, free formaldehyde. As such a formaldehyde compound, there may be employed advantageously, for instance, anhydro methylene citrate which splits off formaldehyde at a temperature of 37° C. It is even possible to place a solid formaldehyde compound being stable in the dry state, and a dry gelatine powder, into the same ampoule and to add an aqueous solution or suspension of the medicament to said dry mixture to dissolve the gelatine and the formaldehyde compound and to cause hardening.

When using coagulating or hardening agents which might react with the therapeutically effective compound, it is advisable to employ said therapeutically effective compounds in a solid state or in a difficultly and slowly soluble form. For instance, when using insulin as therapeutically effective compound, it is preferably employed in the form of its difficultly soluble compounds, such as protamin-insulin, hexamethylene tetramin-insulin and the like. Formaldehyde will then react much quicker with the free amino groups of the gelatine than with the insulin complex.

The system fibrinogen-thrombin may be used for most medicaments. Of course, when administering, for instance, heparin or the like compounds which prevent coagulation of the fibrinogen-thrombin system, it is advisable to use other coagulating agents, such as ninhydrin or salicylic aldehyde, in the place of thrombin.

When using the system fibrinogen-thrombin, the depot formed remains in the tissue for a very long time provided the medicament is added in the form of a colloidal solution, a suspension, or an emulsion, i.e. if the medicament is not substantially dissolved by diffusion or by being squeezed out by contraction of the fibrin gel formed. Such a fibrin gel depot may exert is activity for 1 to two weeks or even longer. If, however, the medicament is present in the form of a crystalloid substance, it is usually dissolved and/or squeezed out of the fibrin gel within one to two days while the fibrin gel remains in the body for a longer period of time. The same is true for other systems. Diffusion of a crystalloidal medicament is also dependent upon the compactness of the gel.

The prolonged effect of a depot, according to this invention, is furthermore dependent upon other factors, such as injected volume, shape of the gel within the tissue, i.e. its surface, place of injection in relation to the flow of the body fluids etc. Repeated application might cause more rapid dissolution of a gel. When using the system gelatine-formaldehyde or other hardening agents, the prolonged effect of the gel increases with increasing concentration of gelatine and/or formaldehyde. When producing a depot by intramuscular injection, it is advisable to employ higher concentrations of hardening agent because in this instance, the gel is more rapidly dissolved. Formaldehyde gels remain effective for days but quinone gels for weeks.

As stated above, when using a liquid and a solid component, either, by means of a double ampoule, the liquid, immediately before injection, is added to the solid or, vice versa, the solid to the liquid. Two liquid components may either be mixed by adding the one to the other and mixing the same outside the syringe or both may be withdrawn from their ampoules and may be mixed within the syringe.

The following examples serve to illustrate the invention without, however, limiting the same to them.

Example 1

2 cc. of an aqueous solution containing 0.4 g. of gelatine, 0.1 g. of potassium thiocyanate, 14 mg. of calcium chloride, and, suspended therein, 100 mg. of estradiol benzoate, are filled into ampoule A. Another ampoule B contains 4 mg. of formaldehyde in 0.5 cc. of water. Both ampoules are heated to about body temperature. The contents of the formaldehyde ampoule B are added to the contents of the other ampoule A and the combined solutions are quickly, but thoroughly mixed. The mixture is withdrawn by means of a syringe and is immediately injected. At the place of injection, a depot of the estrogenic hormone is formed due to hardening of the gelatine which takes place within a few minutes.

Example 2

Ampoule A contains 0.4 g. of meperidine hydrochloride, dissolved in 2 cc. of a 22% gelatine solution containing 0.1 g. of potassium thiocyanate.

Ampoule B contains 0.5 cc. of water, 3 mg. of formaldehyde, and 25 mg. of sodium chloride.

Immediately before injection, both solutions are heated to body temperature and are withdrawn into a syringe wherein they are intimately mixed as described above. A depot of meperidine is formed gradually releasing said analgesic.

Example 3

Ampoule A: 0.3 g. of meperidine hydrochloride dissolved in 2 cc. of a 17% gelatine solution containing 0.2 g. of potassium thiocyanate, Ampoule B: 0.4 mg. of chromium in the form of 4 mg. of chrome alum, and 50 mg. of sodium chloride are dissolved in 0.5 cc. of water.

A depot of meperidine is produced by proceeding in the same manner as described in the preceding examples.

Example 4

Ampoule A: 0.5 g. of meperidine base are finely dispersed and suspended in 3 cc. of a 20% gelatine solution containing 0.12 g. of potassium thiocyanate and 10 mg. of calcium chloride.

Ampoule B: 3 mg. of formaldehyde and 40 mg. of sodium chloride are dissolved in 0.5 cc. of water.

A depot of meperidine is produced by proceeding in the same manner as described in the preceding examples.

Example 5

Ampoule A: 0.3 g. of meperidine hydrochloride are dissolved in 5 cc. of water. The pH of said solution is adjusted to 7.0 by the addition of sodium hydroxide solution. The resulting solution is filled up to 5 cc.

Ampoule B: contains 0.3 g. of fibrinogen in dry powdered form.

Ampoule C: 10 units of thrombin in dry powdered form.

The contents of ampoule A are added to the fibrinogen ampoule and shaken until all the fibrinogen is dissolved. Thereafter the solution is heated to body temperature and is added to ampoule C containing the thrombin and is shaken until a clear solution is obtained. The mixture is immediately injected, producing a depot of meperidine of prolonged activity.

Example 6

Ampoule A: 0.5 g. of meperidine base are suspended in 5 cc. of a 5% gelatine solution. The pH-value of said suspension is adjusted to about 8.0 by the addition of sodium hydroxide solution.

Ampoule B: Contains 0.2 g. of fibrinogen and 2.5 units of thrombin, both substances in dry powdered state.

Shortly before injection the contents of ampoule A are added to the dry powder of ampoule B. The mixture is shaken until the fibrinogen and thrombin are completely dissolved, and is then injected. A depot of meperidine of prolonged activity is produced thereby.

Example 7

Ampoule A: Contains 5 cc. of a phosphate buffer solution of a pH of 7.8.

Ampoule B: Contains 0.3 g. of fibrinogen in dry powdered state.

Ampoule C: Contains 5 units of thrombin and 1.0 g. of meperidine base.

First the contents of ampoule A are added to ampoule C until the thrombin is dissolved and the meperidine base is finely suspended throughout the solution. Said suspension, immediately before injection, is added to the contents of ampoule B and is thoroughly mixed therewith whereafter the suspension is injected. A meperidine depot of prolonged activity is produced thereby.

Example 8

Ampoule A: 0.05 g. of morphine hydrochloride are dissolved in 3 cc. of a 22% aqueous gelatine solution containing 0.1 g. of potassium thiocyanate.

Ampoule B: Contains 0.5 cc. of a 1% aqueous formaldehyde solution containing 30 mg. of sodium chloride.

Both solutions are heated to body temperature and are then withdrawn into an ordinary syringe wherein they are intimately mixed. The mixture is then injected and forms a morphine depot of prolonged activity.

Example 9

Ampoule A: 0.08 g. of morphine base are suspended in 2 cc. of a 20% gelatine solution containing 15 mg. of calcium chloride.

Ampoule B: 0.5 mg. of chromium corresponding to 5 mg. of chrome alum.

Shortly before injection, the chrome alum in ampoule B is dissolved in 0.5 cc. of water. The solution is added to the suspension of ampoule A and is thoroughly mixed therewith. The ampoules were previously heated to about 36° C. As soon as complete mixture is achieved, the suspension is injected forming a morphine depot of prolonged activity.

Example 10

Ampoule A: 0.1 g. of morphine base are suspended in 3 cc. of a 16% gelatine solution containing 90 mg. of potassium thiocyanate and 15 mg. of calcium chloride.

Ampoule B: 0.6 mg. of chromium corresponding to 6 mg. of chrome alum, 4 mg. of formaldehyde, and 25 mg. of sodium chloride, dissolved in 0.5 cc. of water.

The two solutions are withdrawn into a syringe wherein they are thoroughly mixed. On injection, the mixture forms a morphine depot of prolonged activity.

Example 11

Ampoule A: 0.15 g. of morphine base are suspended in 4 cc. of a 20% gelatine solution which has been, by the addition of sodium hydroxide solution, adjusted to a pH of about 8.0 and which contains 0.6 g. of magnesium chloride.

Ampoule B: 1 cc. of an 0.3% aqueous formaldehyde solution containing 40 mg. of sodium chloride.

The contents of the two ampoules are heated to about body temperature and are mixed in a syringe whereafter they are injected thereby producing a morphine depot of the analgesic and hypnotic effects of which are considerably prolonged.

Example 12

Ampoule A: 0.2 g. of morphine base are suspended in 6 cc. of a 5% gelatine solution being adjusted, by the addition of sodium hydroxide solution, to a pH of about 7.8.

Ampoule B: Contains 0.3 g. of fibrinogen and 3 units of thrombin in dry powdered form.

The contents of ampoule A are added, immediately before injection, to ampoule B and are thoroughly mixed therewith. Thereafter the mixture is injected and forms a morphine depot of considerably prolonged activity.

Example 13

Ampoule A: 0.02 g. of codeine base are suspended in 2 cc. of a 20% gelatine solution containing 0.2 g. of magnesium sulfate and being adjusted, by addition of sodium hydroxide solution, to a pH of about 8.0.

Ampoule B: 0.5 cc. of an 0.4% aqueous formaldehyde solution having dissolved therein 25 mg. of sodium chloride.

The contents of both ampoules are heated to body temperature and are mixed in a syringe as described above. The mixture is immediately injected and forms a codeine depot of prolonged activity.

Example 14

Ampoule A: 0.05 g. of codeine phosphate are dissolved in 2 cc. of a 15% gelatine solution containing 0.1 g. of potassium thiocyanate.

Ampoule B: 0.5 mg. of chromium corresponding to 5 mg. of chrome alum, dissolved in 0.5 cc. of water.

The two solutions are withdrawn from their ampoules into a syringe and are thoroughly mixed therein. After injection, a depot of codeine phosphate of considerably prolonged activity is obtained.

Example 15

Ampoule A: 0.1 g. of codeine base are suspended in 3 cc. of a 20% gelatine solution containing 100 mg. of potassium thiocyanate, said gelatine solution being adjusted, by the addition of sodium hydroxide solution, to a pH of about 7.5.

Ampoule B: 0.5 cc. of an 0.8% aqueous formaldehyde solution in which 25 mg. of sodium chloride are dissolved.

The two ampoules are heated to body temperature and are mixed in a syringe. Immediately thereafter, the mixture is injected yielding a depot of codeine of considerably prolonged activity.

Example 16

Ampoule A: 0.01 g. of dihydro codeine base are suspended in 2 cc. of a 22% gelatine solution containing 15 mg. of calcium chloride.

Ampoule B: 0.5 cc. of a 1% aqueous formaldehyde solution having dissolved therein 40 mg. of sodium chloride.

The two ampoules are mixed, after heating to body temperature, in a syringe and are injected, as soon as mixing is completed. The dihydro codeine depot produced is effective for a considerable period of time.

Example 17

Ampoule A: 0.05 g. of dihydro codeinone base are suspended in 2 cc. of a 20% gelatine solution containing 0.1 g. of magnesium chloride and being adjusted to a pH of about 7.5.

Ampoule B: 0.5 cc. of a 1% aqueous formaldehyde solution having dissolved therein 50 mg. of sodium chloride.

A depot of dihydro codeinone is produced in the same manner as described in the preceding examples.

Example 18

Ampoule A: 0.1 g. of dihydro codeinone base are suspended in 4 cc. of a 20% gelatine solution containing 20 mg. of calcium chloride and 0.1 g. of potassium thiocyanate.

Ampoule B: 6 mg. of chromium corresponding to 60 mg. of chrome alum, and 6 mg. of formaldehyde are dissolved in 0.5 cc. of water.

A depot of dihydro codeinone is produced in the same manner as described in the preceding examples.

Example 19

Ampoule A: 0.05 mg. of methadone base are suspended in 2 cc. of a 20% gelatine solution containing 0.1 g. of potassium thiocyanate.

Ampoule B: 0.5 cc. of a 1% formaldehyde solution having dissolved therein 50 mg. of sodium chloride.

A depot of methadone of prolonged activity is produced in the same manner as described in the preceding examples.

Of course, other non-opiate analgesics and opium as well as opium derivatives may be used as medicaments in the preparations described above, whereby depots of such medicaments are obtained which reduce the number of injections considerably and, therefore, are of great value in relieving pain, especially in such cases as inoperable and incurable cancer and the like.

Example 20

Ampoule A: 1 g. of benzyl alcohol is emulsified in 3 cc. of a 20% gelatine solution containing 0.1 g. of potassium thiocyanate and being adjusted, by addition of sodium hydroxide solution, to a pH of about 8.0.

Ampoule B: 0.5 cc. of an 0.6% formaldehyde solution.

The ampoule contents are mixed shortly before injection and form a lasting depot which has proved of value, for instance, in incurable neuralgias, pains of amputation stumps and the like.

Example 21

Ampoule A: 1 cc. of a highly concentrated solution of salicylic alcohol in benzyl alcohol is emulsified in 3 cc. of a 20% gelatine solution containing 0.1 g. of potassium thiocyanate and being adjusted to a pH of about 7.5.

Ampoule B: 0.5 cc. of a 1% aqueous formaldehyde solution to which 25 mg. of sodium chloride have been added.

The mixture and the administration of the preparation is effected in the same manner as described in the preceeding examples.

Example 22

Ampoule A: 50 mg. of dibucaine hydrochloride are dissolved in 2 cc. of a 23% gelatine solution containing 0.1 g. of potassium thiocyanate.

Ampoule B: 0.4 cc. of an 0.5% aqueous formaldehyde solution to which 25 mg. of sodium chloride are added.

Both solutions are mixed in ampoule A. After about 10 minutes the mixture is withdrawn by means of a syringe and is injected, thereby yielding a depot of considerably longer duration as heretofore possible.

Example 23

Ampoule A: 100 mg. of dibucaine hydrochloride are dissolved in 3 cc. of a 22% gelatine solution containing 0.3 g. of magnesium chloride and being adjusted to a pH of about 7.5 by the addition of the required amount of dibucaine base.

Ampoule B: 0.4 cc. of a 1% aqueous formaldehyde solution to which 20 mg. of sodium benzoate and 20 mg. of sodium chloride are added.

Mixing and administration of the mixed preparations is carried out as described in the preceding examples.

Example 24

Ampoule A: 5 cc. of a 2% solution of dibucaine base in sesame oil is emulsified in 10 cc. of a 20% gelatine solution containing 0.1 g. of calcium thiocyanate. The emulsion is adjusted to a pH of about 8.2.

Ampoule B: 2.5 cc. of an 0.5% aqueous solution of formaldehyde to which 125 mg. of sodium chloride are added.

The required amount of the local anesthetic agent is withdrawn from ampoule A and is mixed in the syringe with the corresponding amount of formaldehyde solution. The injection may be effected immediately after mixing or after a certain period of prehardening in the syringe.

Example 25

Ampoule A: 100 mg. of dibucaine hydrochloride are dissolved in 2 cc. of a phosphate buffer solution having a pH of about 7.0. 10 mg. of glycerol are added to said solution.

Ampoule B: 100 mg. of fibrinogen, about 2 units of thrombine, and 25 mg. of sodium benzoate, all in dry powdered state. The contents of ampoule A are transferred to ampoule B and are thoroughly mixed therewith until completely dissolved. Immediately thereafter, the mixture is injected and forms a depot of the local anesthetic.

Example 26

Ampoule A: 2.2 cc. of a 1% solution of sodium benzoate being adjusted to a pH of about 7.0.

Ampoule B: 80 mg. of fibrinogen in dry powdered form.

Ampoule C: 1 unit of thrombin and 50 mg. of dibucaine hydrochloride, both substances in dry powdered form.

The contents of ampoule A are first added to ampoule B and shaken until the fibrinogen is dissolved. The solution is then added to ampoule C and again shaken to dissolve the thrombin and local anesthetic agent. The mixture is immediately injected forming a depot of said local anesthetic agent.

Example 27

Ampoule A: A 2% solution of dibucaine base in 2 cc. of olive oil is emulsified in 5 cc. of a 5% gelatine solution.

Ampoule B: 7 units of thrombin in dry powdered form.
Ampoule C: 0.2 g. of fibrinogen in dry powdered form.

Shortly before injection, ampoule A is mixed with ampoule B and the mixture transferred to ampoule C. Thereafter the contents of said ampoules are thoroughly mixed and injected.

Example 28

Ampoule A: 50 mg. of tetracaine hydrochloride are dissolved in 2 cc. of a 22.5% gelatine solution containing 60 mg. of calcium thiocyanate.

Ampoule B: 0.3 cc. of an 0.7% aqueous formaldehyde solution to which 15 mg. of sodium chloride are added.

Mixing and administration of this preparation is carried out as described in the preceeding examples.

Example 29

Ampoule A: 22 mg. of tetracaine hydrochloride and 7.0 mg. of glycerol are dissolved in 2.2 cc. of an 0.3 n phosphate buffer solution.

Ampoule B: 100 mg. of fibrinogen and 5 units of thrombin, both substances in dry powdered form.

Ampoule A is added to ampoule B and the mixture, after complete solution is achieved, is injected to form a tetracaine depot.

Example 30

Ampoule A: 50 mg of tetracaine base are emulsified at a temperature of 45° C. in 2 cc. of a 17% gelatine solution containing 0.2 g. of magnesium sulfate. The emulsion is adjusted to a pH of about 8.2.

Ampoule B: 0.5 cc. of an 0.3% aqueous formaldehyde solution to which 80 mg. of sodium chloride are added.

Mixing and administration of the contents of said two ampoules are carried out as described in the preceeding examples.

Example 31

Ampoule A: 10 cc. of a 10% gelatine solution containing 1.0 g. of procaine hydrochloride and being adjusted, by means of acetate buffer solution, to a pH of about 7.0.

Ampoule B: 200 mg. of fibrinogen in dry powdered form.

Ampoule C: 2.5 units of thrombin in dry powdered form.

The contents of ampoule A are added to ampoule B and, after fibrinogen is dissolved, to ampoule C. As soon as thrombine is dissolved, the mixture is injected to form a depot of procaine. The gelatine addition to the fibrinogen-thrombin solution has the advantage that the gel concentration is increased and the diffusion of procaine is furthermore restarded.

Example 32

Ampoule A: 3 cc. of a 15% gelatine solution containing 150 mg. of procaine hydrochloride and 0.1 g. of potassium thiocyanate.

Ampoule B: 0.5 cc. of an aqueous solution containing 0.7 mg. of chromium in the form of 7 mg. of chrome alum, and 0.1 g. of sodium chloride.

The solutions are mixed in a syringe and are injected immediately after mixing, forming a depot of procaine in the body. This preparation, on account of its chromium content should not be used for nerve block anesthesia.

In a similar manner as described in the preceding examples, other local anesthetics may be used, such as butethamine hydrochloride or formate, butacaine sulfate, diperodon hydrochloride, lidocaine hydrochloride, naepaine hydrochloride, phenacaine hydrochloride, piperocaine hydrochloride, and the bases derived therefrom, and others more. In the case of anesthetic agents of the type of primary amines, it is advisable to use such solidifrying or hardening agents which do not react with the primary amino groups while with tertiary and secondary amines such reactions are not to be feared.

Example 33

Ampoule A: 2 cc. of a 20% solution of camphor in peanut oil are emulsified in 5 cc. of a 15% gelatine solution containing 35 mg. of calcium chloride.

Ampoule B: 1 cc. of an aqueous solution containing 0.1% of chromium in the form of chrome alum.

Solution B is added, while stirring thoroughly, to emulsion A thereby yielding a mixture which, on injection, produces a camphor depot in the body.

Example 34

Ampoule A: 3 cc. of camphor liniment (U.S. Pharmacopeia XVI) are emulsified in 6 cc. of a 15% gelatine solution containing 50 mg. of calcium chloride.

Ampoule B: 0.6 cc. of a 1.5% aqueous formaldehyde solution containing 30 mg. of sodium chloride.

After adding solution B to emulsion A, a mixture is obtained which, on injection, forms a camphor depot.

Example 35

Ampoule A: 4 cc. of camphor liniment (U.S. Pharmacopeia XIV) are emulsified in 4 cc. of a 12% gelatine solution containing 0.8 g. of magnesium chloride.

Ampoule B: 0.6 cc. of an aqueous solution of 1.0 mg. of chromium in the form of chrome alum.

The ampoule contents are mixed in a syringe and are then injected thereby forming a depot of camphor.

Example 36

Ampoule A: 1 g. of camphor is finely suspended in 5 cc. of a 10% gelatine solution.

Ampoule B: 0.2 g. of fibrinogen in dry powdered form.

Ampoule C: 5 units of thrombin in dry powdered form.

The camphor suspension of ampoule A is added to ampoule B. After fibrinogen is completely dissolved, the mixture is added to ampoule C and is injected as soon as thrombin is dissolved, thereby forming a camphor depot.

Example 37

Ampoule A: 0.4 g. of methyl isopropyl cyclohexenone (hexetone) are emulsified in 3 cc. of a 16% gelatine solution containing 90 mg. of potassium thiocyanate.

Ampoule B: 0.5 cc. of an aqueous solution containing 0.6 mg. of chromium in the form of chrome alum.

Both ampoule contents are mixed in a syringe and are injected immediately after mixing, forming a depot of said analeptic agent.

Example 38

Ampoule A: 1 g. of methyl isopropyl cyclohexenone (hexetone) is emulsified in 10 cc. of a 20% gelatine solution containing 0.5 g. of magnesium sulfate.

Ampoule B: 0.5 cc. of a 1% aqueous formaldehyde solution containing 50 mg. of sodium chloride.

The ampoule contents are mixed and administered as described in the preceding examples.

Example 39

Ampoule A: 10 cc. of a 20% gelatine solution containing 10% of sodium salicylate, 10% of hexetone, and 3% of potassium thiocyanate and being adjusted to a pH of 8.0.

Ampoule B: 2.5 cc. of an 0.5% aqueous formaldehyde solution containing 200 mg. of sodium chloride.

The ampoule contents are mixed and administered as described in the preceding examples; for each administration 0.5 cc. of solution B are mixed with 2.0 cc. of solution A.

Example 40

Ampoule A: 2 cc. of a 16% gelatine solution containing 0.1 g. of potassium thiocyanate and 0.2 g. of pentylene tetrazol.

Ampoule B: 0.5 cc. of an aqueous solution containing 0.5 mg. of chromium in the form of chrome alum.

Both solutions are mixed in a syringe and are then administered to form a pentylene tetrazol depot.

Example 41

Ampoule A: 3 cc. of a 16% gelatine solution containing 0.3 g. of pentylene tetrazol, 0.15 g. of a mixture of caffeine and sodium salicylicum (1:1), and 90 mg. of potassium thiocyanate.

Ampoule B: 0.5 cc. of an aqueous solution containing 0.7 mg. of chromium in the form of chrome alum.

Mixing and administration of this preparation is carried out as described in the preceding examples.

Example 42

Ampoule A: 10 cc. of a 20% gelatine solution containing 2.5 g. of nikethamide, 50 mg. of calcium chloride, and 0.3 of potassium thiocyanate.

Ampoule B: 0.5 cc. of an aqueous solution containing 0.5 mg. of chromium in the form of chrome alum. 5 ampoules B are provided for 1 ampoule A.

2 cc. of ampoule A are mixed in the syringe with 0.5 cc. of ampoule B and the mixture is then injected to form a nikethamide depot in the body.

Example 43

Ampoule A: 4 mg. of strychnine nitrate are dissolved in 2 cc. of a 15% gelatine solution containing 0.2 g. of magnesium chloride.

Ampoule B: 0.5 cc. of an aqueous solution containing 0.5 mg. of chromium in the form of chrome alum and 50 mg. of sodium chloride.

Both ampoule contents are mixed and administered as described in the preceding examples to produce a strychnine depot.

Example 44

Ampoule A: 8 mg. of strychnine nitrate are dissolved in 4 cc. of a 16% gelatine solution containing 20 mg. of calcium chloride.

Ampoule B: 0.6 cc. of an aqueous solution of 0.6 mg. of chromium in the form of chrome alum, 5 mg. of formaldehyde, and 60 mg. of sodium chloride.

Both ampoule contents are mixed and administered as described in the preceding examples to produce a strychnine depot.

Example 45

Ampoule A: 25 mg. of strychnine base are suspended in 10 cc. of a 20% gelatine solution containing 1 g. of magnesium sulfate, and being adjusted to a pH of about 8.0.

Ampoule B: 0.5 cc. of an 0.4% aqueous formaldehyde solution containing 25 mg. of sodium chloride.

Both ampoule contents are mixed and administered as described in the preceding examples to produce a strychnine depot.

Example 46

Ampoule A: 4.0 mg. of strychnine nitrate and 0.4 g. of a mixture of caffeine and sodium salicylate (1:1) are dissolved in 4 cc. of a 20% gelatine solution containing 20 mg. of calcium chloride and 0.1 g. of potassium cyanate.

Ampoule B: 0.5 cc. of a 1.6% aqueous formaldehyde solution containing 35 mg. of sodium chloride.

Both ampoule contents are mixed and administered as described in the preceding examples to produce a strychnine depot. In the place of strychnine and strychnine salts, other strychnine derivatives, such as strychnine oxide, strychnic acid, and the like, may also be used. The prolonged effect of a preparation, according to this invention, is rather remarkable. Another advantage is that the cumulative effect of strychnine is decreased and retarded.

Example 47

Ampoule A: 6 cc. of a 20% gelatine solution containing 1.2 g. of magnesium sulfate and 0.6 g. of a mixture of caffeine and sodium salicylicum (1:1).

Ampoule B: 0.5 cc. of a 2% aqueous formaldehyde solution containing 25 mg. of sodium chloride.

The two solutions are mixed in the syringe and subcutaneously injected to produce a caffeine depot.

Example 48

Ampoule A: 100 mg. of lobeline sulfate are dissolved in 4 cc. of a 20% gelatine solution containing 20 mg. of calcium thiocyanate.

Ampoule B: 0.5 cc. of a 1.2% aqueous formaldehyde solution containing 40 mg. of sodium chloride.

The two solutions are mixed in the syringe and are subcutaneously injected to produce a lobeline depot.

Example 49

Ampoule A: 10 cc. of a 23% gelatine solution containing 0.3 g. of potassium thiocyanate, an amount of digitalis glucosides, for instance, in the form of digitoxin (U.S. Pharmacopeia XIV) corresponding to 0.25 g. of digitalis (U.S. Pharmacopeia XIV), and 10 mg. of dibucaine.

Ampoule B: 0.3 cc. of a 1% aqueous formaldehyde solution containing 30 mg. of sodium chloride. 5 ampoules B are provided for each ampoule A.

2 cc. of solution A and 0.3 cc. of solution B are mixed in the syringe and are injected subcutaneously to form a depot of digitalis glucosides.

Example 50

Ampoule A: 2 cc. of a 20% gelatine solution containing digitalis glycosides corresponding to 0.2 g. of digitalis, and 0.2 g. of magnesium chloride.

Ampoule B: 0.5 cc. of an aqueous solution containing 0.5 mg. of chromium in the form of chrome alum and 25 mg. of sodium chloride.

The two solutions are mixed and injected subcutaneously to form a depot of digitalis glycosides.

Example 51

Ampoule A: 0.5 mg. of ouabain and 10 mg. of dibucaine hydrochloride are dissolved in 10 cc. of a 23% gelatine solution.

Ampoule B: 0.5 cc. of an aqueous solution containing 5 mg. of formaldehyde and 35 mg. of sodium chloride.

The two solutions are mixed in the syringe and are administered by subcutaneous injection to form a depot of ouabain.

Example 52

Ampoule A: 0.1 mg. of ouabain, 5 mg. of tetracaine hydrochloride and 0.1 g. of potassium thiocyanate are dissolved in 2 cc. of a 15% gelatine solution.

Ampoule B: 0.5 cc. of an aqueous solution containing 0.5 mg. of chromium in the form of chrome alum and 25 mg. of sodium chloride.

Both solutions are mixed and administered as described in the preceding examples to produce an ouabain depot.

Example 53

Ampoule A: 0.2 mg. of ouabain, 10 mg. of dibucaine hydrochloride, and 0.2 g. of magnesium sulfate are dissolved in 2 cc. of an 18% gelatine solution.

Ampoule B: 0.5 cc. of an aqueous solution containing 0.3 mg. of chromium in the form of chrome alum, 4 mg. of formaldehyde and 50 mg. of sodium chloride.

Both solutions are mixed in the syringe and immediately injected subcutaneously to produce a depot of ouabain.

Example 54

Ampoule A: 0.1 g. of heparin sodium and 60 mg. of potassium thiocyanate are dissolved in 2 cc. of a 15% gelatine solution.

Ampoule B: 0.3 cc. of an aqueous solution containing 0.5 mg. of chromium in the form of chrome alum.

Both solutions are mixed in the syringe and are then injected subcutaneously to produce a depot of heparin which slowly and gradually releases the heparin over a considerably longer period of time as heretofore possible.

*Example 55*

Ampoule A: 0.1 g. of bis-hydroxycoumarin and 30 mg. of potassium thiocyanate are dissolved in 2 cc. of a 20% gelatine solution.

Ampoule B: 0.3 cc. of an aqueous solution containing 0.3 mg. of chromium in the form of chrome alum and 15 mg. of sodium chloride.

Both solutions are mixed in a syringe and are then injected intramuscularly to produce a depot of bis-hydroxycoumarin.

Other anticoagulants may be used likewise.

*Example 56*

Ampoule A: a solution of 25 mg. of testosterone propionate in 0.5 cc. of sesame oil is emulsified in 2 cc. of a 20% gelatine solution containing 100 mg. of potassium thiocyanate.

Ampoule B: 0.5 cc. of a 1% aqueous formaldehyde solution containing 40 mg. of sodium chloride.

The contents of both ampoules are mixed and, immediately thereafter, injected intramuscularly to produce a depot of testosterone propionate lasting at least four times as long as the same amount of testosterone propionate administered in oily solution.

*Example 57*

Ampoule A: 50 mg. of testosterone are suspended in 2 cc. of a 22% gelatine solution containing 0.2 g. of magnesium chloride.

Ampoule B: 0.5 cc. of a 1% aqueous formaldehyde solution containing 50 mg. of sodium chloride.

The contents of both ampoules are mixed in a syringe and the mixture is then injected intramuscularly to form a testoterone depot.

*Example 58*

Ampoule A: 300 mg. of methyl testosterone are suspended in 5 cc. of a 5% gelatine solution containing 10 mg. of glycerol.

Ampoule B: 0.2 g. of fibrinogen in dry powdered form.

Ampoule C: 7.5 units of thrombin in dry powdered form.

The contents of ampoule A are added to ampoule B and, after fibrinogen is dissolved, to ampoule C, whereupon the mixture is injected intramuscularly to form a depot of methyl testosterone.

*Example 59*

Ampoule A: 300 mg. of testosterone are finely suspended in 3 cc. of a 15% gelatine solution containing 20 mg. of calcium chloride.

Ampoule B: 10 mg. of benzoquinone in dry powdered form.

The contents of ampoule A are added to ampoule B and, after thorough mixing, the mixture is injected to form a depot of testosterone.

*Example 60*

Ampoule A: 50 mg. of testosterone propionate dissolved in 1 cc. of olive oil, are emulsified in 4 cc. of an 18% gelatine solution containing 160 mg. of potassium thiocyanate.

Ampoule B: Contains 20 mg. of toluquinone.

First toluquinone is dissolved by adding 1.0 cc. of distilled and sterile water to ampoule B. To said solution the content of ampoule A is given and rapidly and thoroughly mixed therewith. On injecting the mixture, a depot of testosterone propionate is obtained.

*Example 61*

Ampoule A: 25 mg. of estradiol benzoate are suspended in 5 cc. of a 10% gelatine solution containing 150 mg. of sodium chloride and 5 mg. of glycerol.

Ampoule B: 0.2 g. of fibrinogen and 10 units of thrombin, both substances in dry powdered form.

The contents of ampoule A are mixed with the dry powder in ampoule B to dissolve said substances. The mixture is then intramuscularly injected to form an estradiol benzoate depot of considerably prolonged activity.

*Example 62*

Ampoule A: 100 mg. of ethinyl estradiol are suspended in 5 cc. of a 16% gelatine solution.

Ampoule B: Contains 24 mg. of benzoquinone.

The contents of ampoule A are added to ampoule B and, after benzoquinone is dissolved, the mixture is injected to form a depot of ethinyl estradiol.

*Example 63*

Ampoule A: 100 mg. of diethyl stilbestrol dipropionate are suspended in 6 cc. of a 10% gelatine solution containing 18 mg. of glycerol.

Ampoule B: 0.2 g. of fibrinogen and 12 units of thrombin, both substances in dry powdered form.

The suspension of ampoule A is added to ampoule B and, after solution has taken place, the mixture is injected to form a diethyl stilbestrol dipropionate depot.

*Example 64*

Ampoule A: 50 mg. of estradiol dipropionate are dissolved in 1 cc. of sesame oil. Said solution is emulsified in 5 cc. of a 5% gelatine solution containing 25 mg. of glycerol.

Ampoule B: 0.3 g. of fibrinogen and 9 units of thrombin, both substances in dry powdered form.

The contents of ampoule A are added to ampoule B and the emulsion obtained on thorough mixing, is injected to form a depot of estradiol dipropionate.

*Example 65*

Ampoule A: 50 mg. of progesterone are dissolved in 1 cc. of olive oil. Said solution is emulsified in 4 cc. of a 1% gelatine solution.

Ampoule B: 0.2 g. of fibrinogen and 3 units of thrombin, both substances in dry powdered form.

The contents of ampoule A are added to ampoule B and are mixed thoroughly therewith whereafter the mixture containing the dissolved fibrinogen and thrombin, is injected to produce a depot of progesterone.

*Example 66*

Ampoule A: 150 mg. of progesterone are finely suspended in 6 cc. of a 10% gelatine solution containing 20 mg. of glycerol.

Ampoule B: 0.2 g. of fibrinogen in dry powdered form.

Ampoule C: 10 units of thrombin in dry powdered form.

The contents of ampoule A are added to and intimately mixed with the contents of ampoule B and the mixture thereof is added to and thoroughly mixed with the contents of ampoule C. The mixture is then injected to form a depot of progesterone.

*Example 67*

Ampoule A: 250 mg. of progesterone are finely suspended in 3 cc. of a 20% gelatine solution.

Ampoule B: 20 mg. of benzoquinone in dry powdered form.

The contents of ampoule A are added to ampoule B and are thoroughly mixed therewith. The mixture obtained is injected to form a depot of progesterone.

*Example 68*

Ampoule A: 100 mg. of pregneninolon (ethinyl testosterone) are suspended in 3 cc. of a 20% gelatine solution containing 150 mg. of potassium thiocyanate.

Ampoule B: 0.5 cc. of a 1% formaldehyde solution containing 50 mg. of sodium chloride.

The contents of both ampoules are intimately mixed in a syringe and are then injected to form a depot of pregneninolone.

*Example 69*

Ampoule A: 50 mg. of desoxy corticosterone acetate are finely suspended in 5 cc. of a 20% gelatine solution.

Ampoule B: 20 mg. of benzoquinone in dry powdered form.

The contents of ampoule A are added to ampoule B and are intimately mixed therewith until the benzoquinone is dissolved. Immediately thereafter, the mixture is injected to form a depot of desoxy corticosterone acetate.

*Example 70*

Ampoule A: 100 mg. of cortisone are suspended in 8 cc. of a 2% gelatine solution containing 25 mg. of glycerol.

Ampoule B: 0.4 g. of fibrinogen in dry powdered form.

Ampoule C: 15 units of thrombin in dry powdered form.

First the contents of ampoule A are added to ampoule B. After completely dissolving the fibrinogen, the mixture is added to ampoule C. and is then, after dissolving the thrombin, injected to form a cortisone depot of considerably prolonged activity.

*Example 71*

Ampoule A: A solution of 100 mg. of cortisone in 2 cc. of sesame oil is emulsified in 5 cc. of an 18% gelatine solution containing 250 mg. of potassium thiocyanate and 35 mg. of calcium chloride.

Ampoule B: 1 cc. of a 1% aqueous formaldehyde solution containing 100 mg. of sodium chloride.

Both solutions are mixed in a syringe with each other and the mixture is then injected to form a cortisone depot.

*Example 72*

Ampoule A: 6 cc. of a phosphate buffer solution having a pH value of about 7.0.

Ampoule B: 0.4 g. of fibrinogen in dry powdered form.

Ampoule C: 2000 units of chlorionic gonadotropin and 10 units of thrombin, both substances in dry powdered form.

The contents of ampoule A are added to ampoule B and the fibrinogen is dissolved therein. The mixture is added to ampoule C and, after solution has taken place, is injected to form a depot of chorionic gonadotropin.

*Example 73*

Ampoule A: 5 cc. of a phosphate buffer solution having a pH-value of about 7.0.

Ampoule B: 0.3 g. of fibrinogen and 5000 units of chorionic gonadotropin, both substances in dry powdered form.

Ampoule C: 1 cc. of the same buffer solution containing 20 mg. of glycerol.

Ampoule D: 10 units of thrombin in dry powdered form.

First the contents of ampoules A and B are combined and the solid substances are dissolved. The contents of ampoules C and D are combined to dissolve thrombin. Thereafter the two solutions are withdrawn into a syringe and are intimately mixed therein. The mixture obtained is then injected to form a depot of chorionic gonadotropin.

*Example 74*

Ampoule A: 5 cc. of a phosphate buffer solution having a pH-value of about 7.0 and containing 15 mg. of glycerol.

Ampoule B: 0.3 g. of fibrinogen, 20 units of vasopressin tannate, and 12.5 units of thrombin, all these substances in dry powdered form.

The contents of ampoule A are added to ampoule B and are thoroughly mixed therewith. Thereafter the mixture is injected and produces a depot of vasopressin.

*Example 75*

Ampoule A: 2 cc. of a 20% gelatine solution containing 100 mg. of potassium cyanate.

Ampoule B: 0.4 cc. of an 0.5% aqueous formaldehyde solution containing 40 mg. of sodium chloride.

Ampoule C: 20 units of oxytocin in dry powdered form.

The mixture of ampoules A and B is added to ampoule C and, after oxytocin is dissolved, is injected to form a depot of oxytocin. Such a preparation is especially suitable for stopping postoperative bleeding.

*Example 76*

Ampoule A: 3 cc. of a buffer solution having a pH-value of about 7.0 and containing 12 mg. of glycerol.

Ampoule B: 0.1 g. of fibrinogen, 2 units of thrombin, and 50 mg. of adreno-corticotropic hormone of the pituitary gland, all these substances in dry powdered form.

The contents of ampoule A are added to ampoule B and the mixture, after complete solution has taken place, is immediately injected forming a depot of said adreno-corticotropic hormone.

*Example 77*

Ampoule A: 10 cc. of a 20% gelatine solution, containing 80 units of insulin and being adjusted to a pH of about 8.0.

Ampoule B: 2.0 cc. of an 0.5% aqueous formaldehyde solution.

Both solutions are withdrawn into a syringe and are intimately mixed therein, whereafter the mixture is injected. The depot formed shows a prolonged activity lasting about four times as long as an injection of said insulin without the addition of the system gelatine-formaldehyde.

To demonstrate the prolonged effect of such insulin depots, experiments with rabbits were carried out, according to conventional methods, where the blood sugar content was continuously determined.

One animal had normally a blood sugar lever of 120 mg. %. It reacted well upon insulin administration. 2 units of protamin zinc insulin decreased the blood sugar level to about 60 mg. % during a period of 9 hours. The same animal received, by injection, on another day, 2 cc. of a 20% gelatine solution containing about 8 units of protamin zinc insulin and 0.8 mg. of sodium hydroxide (to form a 0.01 n NaOH-solution). Said gelatine-insulin solution was mixed, shortly before injection, with 0.2 cc. of a 1% aqueous formaldehyde solution. The following Table 9 shows the blood sugar contents after various periods of time: It may be mentioned that the animal was usually fed during the night but that it received only water during the day time. Feeding, of course, had a somewhat disturbing effect upon the blood sugar level.

TABLE 9

| Hours after injection | Day and time of day | Blood sugar values in mg. percent |
|---|---|---|
| 0 | 1st day, 8:30 a.m. | 120 |
| 2 | 1st day, 10:30 a.m. | 79 |
| 7.5 | 1st day, 4:00 p.m. | 65 |
| 25.5 | 2nd day, 10:00 a.m. | 68 |
| 31.5 | 2nd day, 4:00 p.m. | 57 |
| 50.5 | 3rd day, 11:00 a.m. | 123 |

Another animal had, under normal conditions, a blood sugar content of 115 mg. percent. 2 cc. of a 23% gelatine solution containing 8 units of protamin zinc insulin to which solution, shortly before injection, 0.2 cc. of a 2% aqueous formaldehyde solution were added, were injected into said rabbit. The following Table 10 shows the prolonged effect of such a preparation:

TABLE 10

| Hours after injection | Day and time of day | blood sugar values in mg. percent |
|---|---|---|
| 0 | 1st day, 6:00 p.m. | 115 |
| 16 | 2nd day, 10:00 a.m. | 50 |
| 22 | 2nd day, 4:00 p.m. | 55 |
| 40 | 3rd day, 10:00 a.m. | 96 |
| 46 | 3rd day, 4:00 p.m. | 88 |
| 66 | 4th day, 12 noon | 123 |

Although part of the insulin, most probably, was attacked and rendered inactive by the formaldehyde, and although the animal was fed during the night, a marked insulin effect is detectable even after 46 hours.

These animal experiments results were confirmed on diabetic patients. It was possible to retard the period between two injections from 12 hours to 48 hours, i.e. fourfold, by injection of an insulin preparation according to the present invention.

*Example 78*

Ampoule A: 10 cc. of a 16% gelatine solution containing 1 g. of magnesium chloride and being adjusted to a pH of about 8.2.

Ampoule B: 1.5 cc. of an 0.4% aqueous formaldehyde solution containing 150 mg. of sodium chloride.

Ampoule C: 800 units of protamine zinc-insulin in powdered form (containing approximately 1.25 mg. of protamine and 0.2 mg. of zinc per 100 units).

After the contents of ampoules A and B were mixed, the mixture is added to ampoule C and the protamine zinc insulin contained therein is finely suspended in said mixture. On injection, an insulin depot of considerably prolonged activity is produced.

*Example 79*

Ampoule A: 10 cc. of a 22% gelatine solution containing 0.5 g. of potassium cyanate and having suspended therein 400 units of protamine zinc insulin. The suspension is adjusted to a pH of about 7.2.

Ampoule B: 0.5 cc. of an 0.4% aqueous formaldehyde solution containing 50 mg. of sodium chloride. 5 ampoules B are provided for each ampoule A.

2 cc. of ampoule A are intimately mixed in a syringe with the contents of one ampoule B and the mixture is then injected, forming thereby an insulin depot.

*Example 80*

Ampoule A: 10 cc. of a 22% gelatine solution containing 800 units of globin insulin with zinc (4 mg. of globin and 0.3 mg. of zinc per 100 units of insulin), and 0.15 g. of glycerol, and being adjusted to a pH of about 5.0.

Ampoule B: 2.5 cc. of an 0.4% aqueous formaldehyde solution containing an amount of sodium carbonate sufficient to neutralize the acid globin insulin gelatine solution.

The two solutions are mixed and, after carbon dioxide has been completely expelled, are injected to form an insulin depot.

*Example 81*

Ampoule A: 0.05 g. of fibrinogen, 2 units of thrombin, and 200 units of zinc insulin crystals (with about 0.75% of zinc) all these substances in dry powdered form.

Ampoule B: 3 cc. of a phosphate buffer solution having a pH-value of about 7.0.

The contents of ampoule B are added to ampoule A and the mixture, after thorough mixing, is injected to form an insulin depot of considerably prolonged activity.

*Example 82*

Ampoule A: 10 cc. of a 16% gelatine solution being adjusted to a pH of about 8.2.

Ampoule B: 1,500,000 units of procaine penicillin.

Ampoule C: 2.5 cc. of a 3.0% formaldehyde solution containing 150 mg. of sodium chloride.

The contents of ampoules A and C are mixed. The mixture, after standing for about 2 minutes, is added to ampoule B. The procaine penicillin, by shaking, is finely and uniformly suspended in said mixture. On injection, a penicillin depot is formed, said depot having a considerably longer activity than when administering procaine penicillin in the customary manner.

*Example 83*

Ampoule A: 1 cc. of a suspension of 300,000 units of procaine penicillin G in peanut oil is emulsified in 2 cc. of a 5% gelatine solution.

Ampoule B: 0.2 g. of fibrinogen in dry powdered form.

Ampoule C: 6 units of thrombin in dry powdered form.

The contents of ampoule A are added to ampoule B. As soon as fibrinogen is dissolved, the mixture is added to ampoule C and is again intimately mixed until thrombin is dissolved. Immediately thereafter, the mixture is injected producing a depot of penicillin.

*Example 84*

Ampoule A: 4 cc. of a 2% procaine solution.

Ampoule B: 0.1 g. of fibrinogen, 2 units of thrombin, and 2,000,000 units of procaine penicillin G, all these substances in dry powdered form.

The contents of ampoule A are added to ampoule B and are intimately mixed therewith. Injection of the mixture produces a penicillin depot of considerably prolonged effect.

*Example 85*

Ampoule A: 10 cc. of a 20% gelatine solution containing about 0.5 g. of potassium thiocyanate.

Ampoule B: 3 g. of streptomycin sulfate in dry powdered form.

Ampoule C: 2.5 cc. of an aqueous solution containing 2.5 mg. chromium in the form of chrome alum and 250 mg. of sodium chloride.

Ampoules A and B are mixed with each other and the mixture is added to ampoule C. After intimate mixing, the mixture is injected, producing a depot of streptomycin of considerably prolonged activity.

*Example 86*

Ampoule A: 2 cc. of a 10% gelatine solution.

Ampoule B: 250 mg. of aureomycin hydrochloride in dry powdered form.

Ampoule C: 50 mg. of fibrinogen and 1 unit of thrombin, both substances in dry powdered form.

The contents of ampoules A and C are mixed with each other. The mixture is added to ampoule B and vigorously shaken. On injecting the resulting mixture, a depot of aureomycin is produced.

*Example 87*

Ampoule A: 3 cc. of a 3% gelatine solution, being adjusted to a pH of about 7.0.

Ampoule B: 0.1 g. of fibrinogen, 1.5 units of thrombin, 300,000 units of crystalline procaine penicillin G, 100,000 units of buffered crystalline sodium penicillin G, and 1 g. of dihydrostreptomycin in the form of its sulfate, all said compounds present in the form of a fine dry powder.

The contents of ampoule A are added to ampoule B and are vigorously shaken therewith. The mixture obtained is then injected intramuscularly and forms a depot of the antibiotics of considerably prolonged activity.

Example 88

Ampoule A: 2 cc. of a 5% gelatine solution.

Ampoule B: 500 mg. of crystalline terramycin hydrochloride in dry powdered form.

Ampoule C: 50 mg. of fibrinogen and 1 unit of thrombin, both in dry powdered form.

The contents of ampoules A and C are mixed with each other and, after fibrinogen and thrombin are dissolved, the solution obtained is added to ampoule B. The mixture is vigorously shaken and is then injected intramuscularly to produce a depot of the antibiotic of considerably prolonged activity.

Example 89

Ampoule A: 10 cc. of a 15% gelatine solution containing 0.2 g. of potassium thiocyanate and finely suspended therein 1 g. of iodoform.

Ampoule B: 50 mg. of dichro chloride, 30 g. of silver thiocyanate, and 50 mg. of barium sulfate.

Ampoule C: 1.5 cc. of a 5% solution of ammonium chloride.

The contents of ampoule C are added to ampoule B to dissolve the dichro chloride and to suspend the insoluble salts by repeated vigorous shaking. The mixture is allowed to stand for about 30 minutes. Said suspension is then added to ampoule A and is thoroughly mixed therewith. After two minutes the mixture is introduced into an abscess or a fistula wherein it solidifies to a gel which slowly and continuously releases the disinfecting agent.

Example 90

Ampoule A: 5 cc. of a 15% gelatine solution containing 0.5 g. of magnesium chloride, and 0.5 g. of the sodium salt of p-amino salicylic acid.

Ampoule B: 1 cc. of an aqueous solution containing 1 mg. of chromium in the form of chrome alum and 50 mg. of sodium chloride.

The contents of both ampoules are intimately mixed in a syringe and then introduced into abscesses caused by tuberculosis. The solidified gel slowly and gradually releases the p-amino salicylic acid.

Example 91

Ampoule A: 5 cc. of a 15% gelatine solution containing 250 mg. of potassium thiocyanate, 30 mg. of barium sulfate, 10 mg. of procaine hydrochloride, and 10 mg. of nitrofurazone.

Ampoule B: 0.5 cc. of a 1.2% aqueous formaldehyde solution, containing 50 mg. of sodium chloride.

The contents of both ampoules are mixed in a syringe. The mixture is then introduced into a cavity of the body whereby a prolonged disinfecting effect is achieved.

Example 92

Ampoule A: 10 cc. of a 12% gelatine solution containing 2 g. of ethylstibamine, 40 mg. of barium sulfate, and 5 mg. of dibucaine hydrochloride.

Ampoule B: 70 mg. of benzoquinone in dry powdered form.

The contents of ampoule A are added to ampoule B and are intimately mixed therewith until benzoquinone is completely dissolved. The mixture is then injected intramuscularly to form a depot of ethylstibamine having a prolonged effect.

Example 93

Ampoule A: 20 cc. of a 15% gelatine solution containing 1 g. of potassium thiocyanate, 0.5 g. of sodium morrhuate, and 0.1 g. of benzyl alcohol.

Ampoule B: 2 cc. of a 2% formaldehyde solution containing 200 mg. of sodium chloride.

The contents of the two ampoules are mixed with each other and the mixture is then injected into varicose veins. The gel produced adheres strongly to the walls of the veins so that embolus formation is avoided. The preparation, on account of its prolonged effect, causes sclerosing of the veins with fewer injections as heretofore.

Of course, many changes and variations may be made in the above given examples. Other therapeutically effective compounds may be used provided it is desired to produce a prolonged effect of the same. A preparation according to this invention may have the further advantage that the medicament is released at about the same rate over almost the entire period of activity while with depots as they were employed heretofore, in the beginning, there was usually a very strong shock-like effect while towards the end of the activity of said depot diminished considerably and frequently did not suffice to cause any therapeutic effect. Other hardenable, coagulable, settable, solidifiable, or gelatinizable compounds and other agents causing such hardening, coagulating, setting, solidifying, or gelatinizing than those mentioned in the examples may also be used. Likewise, other agents to regulate viscosity, to retard or accelerate hardening, coagulating, setting, solidifying, or gelatinizing, to stabilize the preparations according to this invention and their components, to adjust their pH-value, to protect the therapeutically effective compounds and the like than those mentioned in the examples may be added. Many changes in temperature reaction conditions, concentrations and proportions of the components may be made by those skilled in the art in accordance with the principles set forth herein and in the claims annexed hereto.

The term "protein-like compound" the aqueous solution of which is solidified by the action of a chemical solidifying agent, as used in the specification and the claims annexed hereto, includes not only proteins such as gelatine and casein but also other hardenable, coagulable, settable, solidifiable, gelatinizable compounds, such as fibrinogen, hyaluronic acid, nucleic acids, certain polysaccharides, vegetable gums, synthetic resinous compounds and others more, provided it is possible to retard or accelerate their hardening, coagulating, setting, solidifying, or gelatinizing time to such an extent that their aqueous solutions can be safely injected in the fluid state but, shortly after injection, form a hardened, coagulated, set, solidified, or gelatinized depot in the body which is slowly and gradually absorbed by the body and the body fluids and which, thereby, slowly and gradually releases a therapeutically effective compound uniformly distributed throughout said depot, thus, causing said therapeutically effective compound to exert a prolonged therapeutic effect.

The terms "solidified," "solidifying," "solidifiable" and the like as used in the specification and the claims annexed hereto, refer not only to the conversion of a substance or substance mixture into the solid state, but indicates also any other conversion from the fluid into the solid state, such as hardening, coagulating, setting, gelatinizing and others more. Solidified depots according to this invention are relatively insoluble in water but they are slowly and gradually dissolved, absorbed, decomposed, or in any other manner eliminated by the body fluids on account of their enzymatic or otherwise dissolving power.

The term "aqueous medium," as used in the specification and the claims annexed hereto, includes not only water, but also other water containing media, such as aqueous salt solutions, aqueous buffer solutions, emulsions of the water-in-oil and the oil-in-water type or any other aqueous medium capable of dissolving the solidifiable compound and the solidifying agent and being injectable and substantially non-toxic to the body.

The term "therapeutically effective compound" as used in the specification and in the claims annexed hereto, indicates not only medicaments used in therapy for curing and healing but also chemical compounds which are used as auxiliary means in combatting diseases, such as anesthetics, diagnostic aids, X-ray contrast agents, disinfectants, antiseptics, compounds used for nutritional purposes, prophylactics and others more. Likewise the term "therapeutic effect" indicates the effects of such so-called therapeutically effective agents.

We claim:

1. A pharmaceutical preparation comprising, in aqueous solution, a mixture of gelatine and formaldehyde, the concentration of said gelatine in said solution being at least 10% and the concentration of formaldehyde at least 0.2%, said mixture containing uniformly distributed therethrough a drug, said preparation coagulating not less than about 6 minutes after mixing said gelatine and said formaldehyde to a gelatin gel of reduced solubility in water having said drug uniformly distributed throughout said gel.

2. In a method of producing an injectable pharmaceutical preparation, the steps comprising mixing, shortly before injection, an aqueous gelatine solution of at least 10% gelatine with a dilute aqueous formaldehyde solution, the proportion of formaldehyde to gelatin in the resulting mixture being between about 1:20 and about 1:1000, and incorporating into and uniformly distributing throughout said mixture the drug to be administered by injection.

3. An injectable pharmaceutical preparation forming, on injection, a drug depot at the place of injection, said preparation comprising an injectable aqueous medium, gelatine dissolved therein in an amount corresponding to at least 10% of said preparation, formaldehyde, and the drug to be administered by injection, uniformly distributed throughout said preparation, said formaldehyde and said gelatine being present in said preparation in the proportion between about 1:20 and about 1:1000, said preparation being liquid at body temperature for a time sufficient for injection and, upon injection into the human and animal tissue, depositing said drug depot at the place of injection.

References Cited in the file of this patent

UNITED STATES PATENTS

| | | |
|---|---|---|
| 2,390,088 | Fox | Dec. 4, 1945 |
| 2,415,719 | Abramson | Feb. 11, 1947 |
| 2,530,480 | Pitkin | Nov. 21, 1950 |
| 2,533,004 | Ferry | Dec. 5, 1950 |
| 2,589,210 | McGinty | Mar. 18, 1952 |

OTHER REFERENCES

Loewe: "New Penicillin Products for Sustained Effects," J. Lab. and Clin. Med., January 1949, pp. 67–73.

Science: Feb. 23, 1945, pp. 203–205.

The Jour. of Allergy (Spain), May 1939, pp. 209–214.